US008602558B2

(12) United States Patent
Sadeghian

(10) Patent No.: US 8,602,558 B2
(45) Date of Patent: Dec. 10, 2013

(54) SYSTEM AND METHOD FOR REHABILITATING VISUAL DEFECTS

(76) Inventor: Abbas Sadeghian, Canton, OH (US)

(*) Notice: Subject to any disclaimer, the term of this patent is extended or adjusted under 35 U.S.C. 154(b) by 0 days.

(21) Appl. No.: 13/289,136

(22) Filed: Nov. 4, 2011

(65) Prior Publication Data
US 2012/0287404 A1 Nov. 15, 2012

Related U.S. Application Data

(60) Provisional application No. 61/483,986, filed on May 9, 2011.

(51) Int. Cl.
*A61B 3/02* (2006.01)
*A61B 3/00* (2006.01)

(52) U.S. Cl.
USPC .............................. 351/224; 351/222; 351/246

(58) Field of Classification Search
USPC .................................................. 351/200–246
See application file for complete search history.

(56) References Cited

U.S. PATENT DOCUMENTS

| 5,886,769 | A | 3/1999 | Zolten |
| 6,352,345 | B1 | 3/2002 | Zolten |
| 6,595,636 | B2 | 7/2003 | Zolten |
| 7,520,612 | B2* | 4/2009 | Dai et al. ...................... 351/205 |
| 7,682,021 | B2* | 3/2010 | Sabel ............................ 351/203 |
| 2006/0251316 | A1* | 11/2006 | Tucker et al. ................. 382/141 |

* cited by examiner

*Primary Examiner* — Mohammed Hasan
(74) *Attorney, Agent, or Firm* — Sand & Sebolt

(57) ABSTRACT

The present invention relates to a method of customizing a lens system with selective application of a translucent colored material to stimulate alternative visual pathways and restore vision in the defective areas. The placement of the translucent colored material is based on the results of a visual field examination to determine the areas of visual defect and the areas of normal vision. The lens system is then placed adjacent to the patient's eyes such that the areas of normal vision see through the translucent filter to receive visual information.

19 Claims, 2 Drawing Sheets

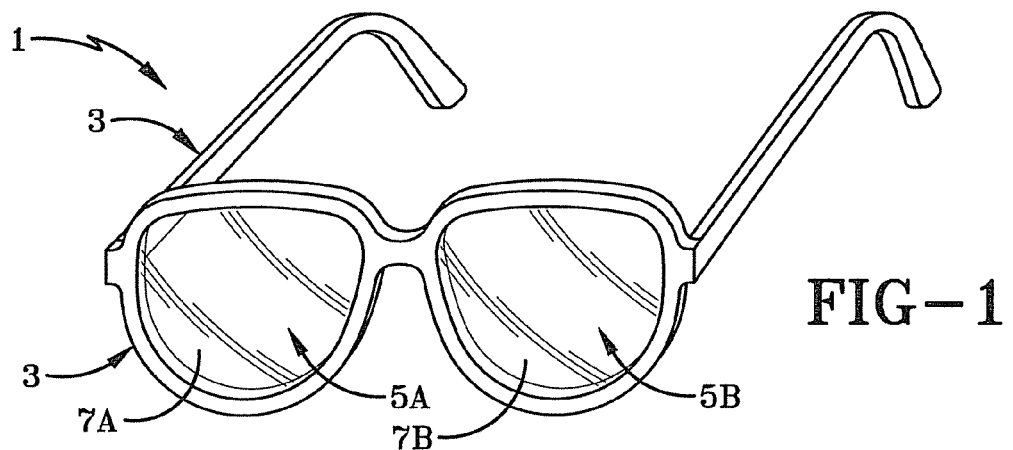
FIG-1
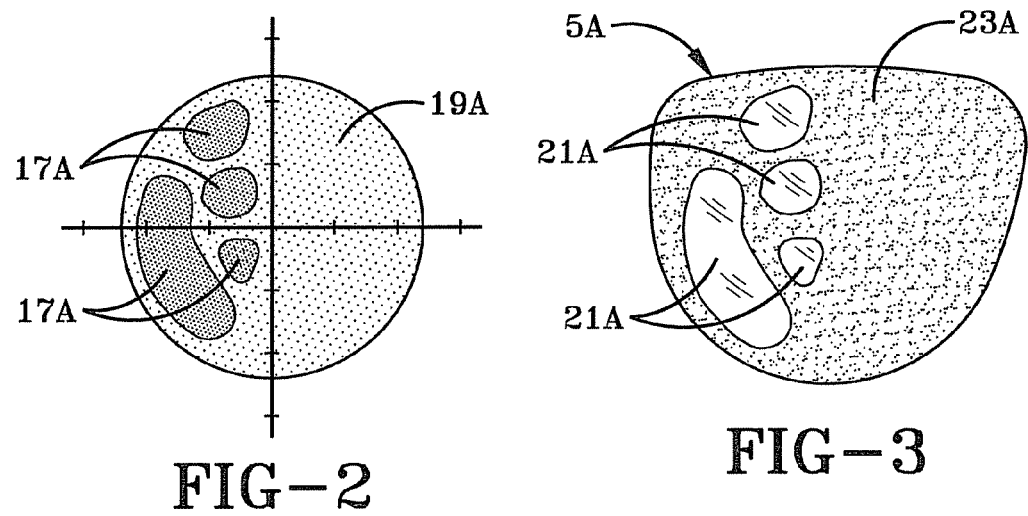
FIG-2
FIG-3
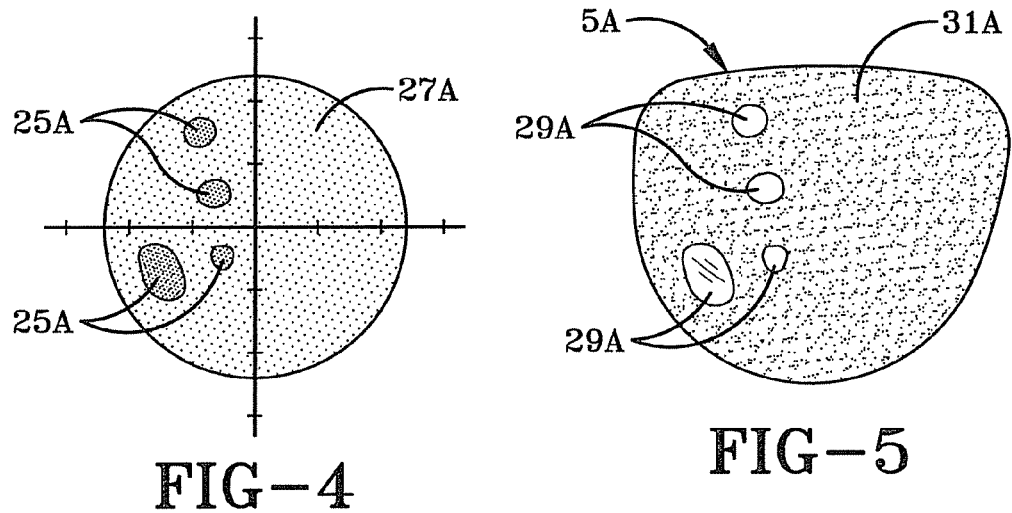
FIG-4
FIG-5

SYSTEM AND METHOD FOR REHABILITATING VISUAL DEFECTS

CROSS-REFERENCE TO RELATED APPLICATION

This application claims priority from U.S. Provisional Application Ser. No. 61/483,986, filed May 9, 2011, the disclosure of which is incorporated herein by reference.

BACKGROUND OF THE INVENTION

1. Technical Field

The present invention relates to rehabilitation and therapy. More particularly, the invention relates to a system and method for rehabilitating visual defects. Specifically, the invention relates to a customizing a lens system with selective application of a translucent colored material to stimulate alternative visual pathways and restore vision in the defective areas.

2. Background Information

The condition known as hemianopia is a type of deficit in the visual field of humans where decreased vision or blindness takes place in half of the visual field of one or both eyes. The term hemianopia is Greek in origin, where "hemi" means "half", "an" means "without", "posit" means "seeing". In most cases, the visual field loss respects the vertical midline. Thus the individual can properly perceive half of the field of vision in one eye, while the other half of that same eye suffers from a deficit in perception. Typically the eyes themselves are fully functional and not damaged. It is the pathways between the eyes and the brain that are damaged. The information routing and brain cognition of the information perceived by the optic nerve is not transmitted properly to the brain to form a correct and focused image in the individual's mind. The most common causes of this type of damage include stroke, brain tumor, and brain trauma.

The injury caused by any of the above incidents usually leads to varying degrees of inability to see in different parts of the visual field. The mechanism of transport of information from the eye to the brain in right hand dominant individuals is naturally designed to take images from left side of both eyes to right hemisphere of the brain and the right side of both eyes to the left hemisphere of the brain. Consequently, injuries in the right hemisphere of the brain cause difficulties in the left visual field of one or both eyes, and injuries to left hemisphere causes difficulties in the right visual field of one or both eyes. At times the damage is not bad enough to interrupt the patient's visual abilities significantly. At other times the deficit in the visual field is so extensive that it would cause total impairment of the half of the visual field of both eyes.

Since visual abilities are involved in many of physical and cognitive abilities of the person, this interruption of vision could potentially affect additional abilities of the person creating a unique syndrome for each individual. This syndrome could potentially include additional difficulties with visual memory, visual reasoning, hand eye coordination, ambulation, visual organization, and object naming. In many cases, the patient suffers from significant disabilities which permanently interfere with daily activities. For example, person's inability to see from the left visual field commonly known as "left sided neglect" could permanently prevent the person from operating a motor vehicle, as the person cannot see incoming objects on the road. Without the ability to operate a vehicle, in addition to the tremendous detriment to overall quality of life, the individual would also be deprived of many forms of employment.

There have been many attempts at trying to treat this condition. All of these previous attempts can be broadly categorized as utilizing either surgery or therapy. The utilization of surgery for treatment of hemianopia is quite limited and used only in rare cases. As such, the standard treatment method is therapy and rehabilitation. However, this treatment is typically focused on teaching the patient to learn to cope with the vision deficiency, rather than to restore the patient's vision. Rehabilitation is structured around behavioral methods, such as teaching the patient to pay extra attention to the area that they do not see naturally. Although these behavioral methods do have some value, these methods do not remedy the underlying problem. If affected individuals can learn to see and perceive objects properly, therapy and rehabilitation activities are unnecessary as the individual's quality of life is no longer affected by vision deficiency.

U.S. Pat. No. 5,886,769 to Zolten, U.S. Pat. No. 6,352,345 to Zolten, and U.S. Pat. No. 6,595,636 to Zolten, referred to hereinafter as the "Zolten patents", relate to methods of making modifications to different visual devices to encourage healing of the brain without using any invasive techniques. The techniques discussed in the Zolten patents are known in the field as "visual constraint therapy" for treating hemianopia. Under this method of treatment, parts or the entire healthy portion of the visual field is completely blocked by using different methods of obstructing the visual field through glasses, lenses or other devices. Visual constraint therapy places an emphasis on obstructing certain areas of visual field to encourage the brain to develop new neural pathways for connecting the eyes and the brain, thus allowing the patient to see objects in the affected areas. This obstruction may be either complete or partial with respect to coverage of the visually defective areas of the visual field. Over time, the obstruction of the visual field is increased or decreased in size for rehabilitation and neural training purposes.

Visual constraint therapy and the related patents do not consider the use of a translucent obstruction over the healthy portion of the visual field. While the Zolten patents disclose the use of "degree[s] of opacity" and "semi-opaque" occlusion of the visual field, the percentages of opacity are referenced with respect to the overall area of the radial segments or visual obstruction areas. Zolten consistently utilizes occlusion over the healthy portion of the eye, such that visual light cannot pass therethrough. While the overall size may be expanded or reduced over the course of treatment, visual constraint therapy completely occludes the intended area of the visual field.

Although there have been many claims of success utilizing this technique, visual constraint therapy has not been able to provide enough success to be accepted as an effective treatment for hemianopia. Also, in practical terms, the obstruction of a portion of the patient's glasses or lenses could be risky as the patient is deprived of most of their vision until they adapt to the device. As such, most patients find visual constraint therapy unsettling and either never begin the therapy or discontinue treatment before any benefits can be realized. Patients who remain in treatment and are willing to use the device, find that the blockage of the visual field is cosmetically undesirable as the patient stands out in public. This leads to embarrassment and negative feedback. Thus, patients typically only use the device in private, which results in patients experiencing only minimal gain and limited visual restoration.

Furthermore, visual constraint therapy attempts to build new neural pathways for connecting the optic nerve to the brain centers used to process visual input. This type of biochemical restructuring is a very slow and unreliable process.

As such, visual constraint therapy takes a tremendous amount of time before results are realized. As discussed above, patients are already reluctant to wear unsettling and cosmetically undesirable devices. When patients do not experience results after months of therapy, the patients typically get frustrated and discontinue the treatment.

Confronting the above facts, there is a tremendous need in the field to provide an easily reproducible and non-invasive system and method for the treatment of hemianopia. The system and method should not be unsettling to the patient, and should be cosmetically appropriate for public use, such that the individual will maintain treatment throughout the individual's normal daily routine. Furthermore, the system and method involved should result in a relatively quick restoration of vision in the defective areas.

BRIEF SUMMARY OF THE INVENTION

The present invention is a system and method for rehabilitating visual defects, specifically by using translucent color to re-route the information along alternative neural pathways from the eyes to the brain. The system and method of the present invention utilizes pre-existing pathways, making it possible to quickly and completely cure of the condition of hemianopia. The general system and method of the present invention relates to administering a visual field test to a patient, using the test results to define specific areas on a lens corresponding to the visually defective areas of the patient's visual field, selectively applying a translucent colored material onto the areas of the lens where the patient enjoys normal vision, and finally disposing the lens adjacent to the patient's eye for a particular length of time. Thus, the non-defective areas of the patient's eyes must look through the translucent colored material to perceive images. This constant translucent colored filter forces the incoming image data along a different, yet pre-existing, neural pathway between the optic nerve and the brain cortex. Over a short amount of time, these alternative pathways become the default pathways for the optic nerve. As this transformation occurs, it stimulates the defective areas of the patient's eyes to pass vision data along these alternative pathways as well, thus bypassing the damaged pathways and restoring the patient's vision.

The present invention is superior and distinguishable over visual constraint therapy as the patient's visual field is not constrained, and new neural pathways are not necessary or desired. Rather, the present invention uses translucent colored material adjacent to the patient's eyes to encourage the brain to use pre-existing, yet often under-used, pathways of vision. The present invention is fundamentally designed to utilize color as the main method of treatment, as it has been discovered that a translucent color layer between the image and the optic nerve stimulates the optic nerve to use alternative pre-existing pathways between the eyes and the brain. Thus, the present invention uses color to help the brain re-route information through healthy existing pathways, therefore circumventing the affected areas of the brain, rather than encouraging the healing of those affected areas

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 1 is a lens system in accordance with the present invention;

FIG. 2 is a sample result from a first visual field examination showing several large visually defective areas;

FIG. 3 is a lens of the present invention having a translucent colored material selectively disposed thereon;

FIG. 4 is a sample result from a second visual field examination showing several small visually defective areas;

FIG. 5 is a lens of the present invention having a translucent colored material selectively disposed thereon;

Similar numbers refer to similar parts throughout the drawings.

DETAILED DESCRIPTION OF THE INVENTION

Figure 6:
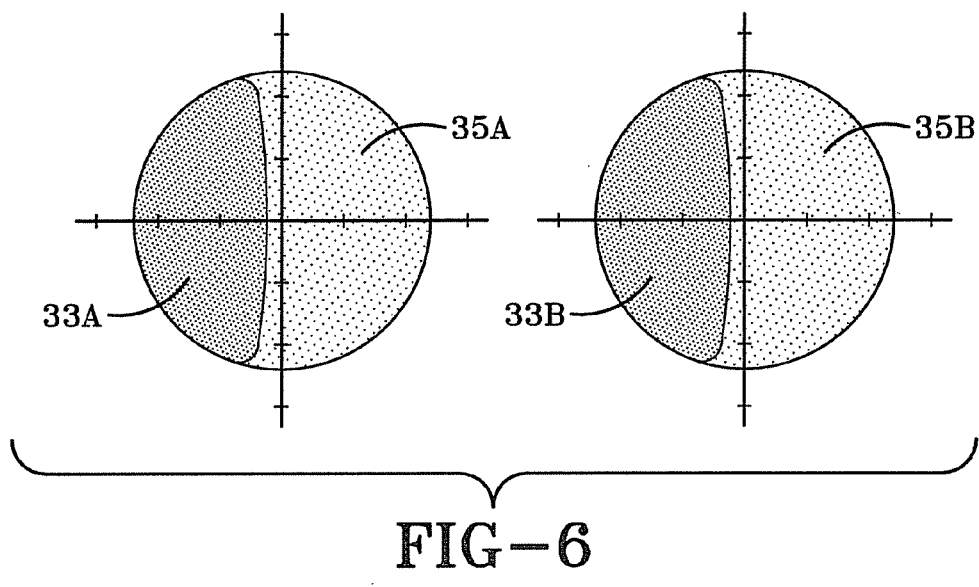
FIG. 6 is a sample result from a third visual field examination showing left-side neglect in both eyes.

As shown in FIGS. 1-8, the preferred embodiment of the present invention incorporates a patient specific lens system 1 with a corresponding treatment method to alter how visual information is passed from the patient's eyes to the patient's brain for cognitive recognition and use.

Lens system 1 used in the present invention is comprised generally of a common off-the-shelf eyeglass frame 3, with a pair of lenses 5A and 5B held therein. If the patient previously required a particular lens prescription before the brain trauma which led to the visual impairment, it is highly desirable that lenses 5A and 5B also incorporate this particular prescription for the patient. Each lens 5A and 5B is generally transparent and includes an outer surface 7A and 7B, respectively. Lens system 1 is preferably the patient's own eyeglasses for everyday use. Furthermore, while lens system 1 is described as being directed to eyeglasses, one would readily understand that only minor modifications in the underlying method would be required to utilize the method with contact lenses. Therefore, contact lenses may alternatively be used as lens system 1.

In accordance with one of the main features of the preferred embodiment of the present invention, a translucent material 9 having a color 11 is selectively applied to outer surfaces 7A and 7B. In accordance with another main feature of the preferred embodiment, the application of translucent material 9 is separately customized and particularly placed on each lens 5A and 5B, based on pre-determined criteria. Furthermore, the application area of translucent material 9 may be unique and distinct with respect to each lens 5A and 5B. In a preferred embodiment of the present invention, material 9 is comprised of a 50/50 by volume aqueous mix of a blue color high gloss acrylic enamel and deionized nanopure water.

The corresponding treatment method which incorporates lens system 1 is hereby described in greater detail. The method is generally comprised of the following steps: diagnosing the particular areas of the patient's eyes which have visual defects, mapping the results of the diagnosis onto a customized and specific modification of each lens 5A and 5B, having the patient wear the customized lens system 1 adjacent to the patient's eyes throughout the day for a set period of days, and repeating the previous steps until a sufficient amount of progress is shown or the visual defects are no longer present. Within the treatment method of the present invention, there is a heavy emphasis placed on providing an extremely detailed and accurate diagnosis of the areas of the visual deficits. The detailed diagnosis produces a much more accurate mapping between the diagnosis and the customizing of lens system 1. As such, the end results and patient treatment are correspondingly enhanced.

During the initial examination, the patient's visual field is assessed utilizing standard visual field examinations which produce as output an extremely accurate matrix corresponding to areas with visual defect and areas without visual defect. Once an accurate diagnosis of the visual defective areas is established through the visual field exam, the visual field exam results are mapped to corresponding areas on outer surfaces 7A and 7B, and lens 5A and 5B are coated using translucent material 9 in the determined areas. In the preferred embodiment, material 9 can only be removed with a specific solvent. Thus, material 9 is removable yet remains secured on outer surfaces 7A and 7B until removal is desired. The coating of lens 5A and/or 5B may be accomplished by utilizing a method known as air brushing to ensure the paint is evenly distributed on the outer surfaces 7A and 7B, and to avoid unevenness. However, any traditional method for applying material 9 may be used, including painting, adhesive, or any other means for applying material 9.

It is a primary feature of the present invention that material 9 includes a color tint 11, hereinafter referred to as color 11, which may be embodied by any color in the visible color spectrum. Thus, material 9 is a translucent colored material. It is another feature of the present invention is that color 11 may be customized to the patient. Experimentation and testing may be done to determine which particular color 11 the patient's brain and visual cortex responds most readily to. For example, some patient's individual brain chemistry tends to react more favorably to treatment when color 11 is embodied in a red or green hue. However, it has been determined through experimentation and research that a large segment of patients respond readily when color 11 is embodied in a blue hue.

Once color 11 and the overall visual diagnosis has been determined for each eye, the particular area of outer surfaces 7A and 7B corresponding to the healthy part of the patient's visual field is covered with material 9. Thus, there exists an inverse mapped relationship between the damaged visual field areas and the areas on surfaces 7A and 7B which are made translucent. Thus, the areas on lens 5A and 5B which correspond to an intact visual field are made translucent by material 9. Likewise, the areas on lens 5A and 5B which correspond to a damaged visual field remain transparent. Depending on the results of the visual field examination the area covered by material 9 can have various shapes to comply with the results of the visual field examination. For example in a case where the center of the vision is normal, but the peripheral vision of both sides of the visual field is affected, translucent material 9 could have the shape of a circle in the middle of lens 5A and the surrounding transparent area would form a ring shape around translucent material 9. Inasmuch as the visually defective areas of a patient's visual field can take any shape, translucent and transparent areas can correspondingly take any shape as well.

The patient is instructed to wear the lens system 1 at all times except during sleep and shower if practical. It is emphasized that interruptions however small would significantly delay the improvement of the condition. The patient is examined again in two weeks and a new visual field examination is conducted. If successful, the patient's new visual field examination should manifest a significant improvement, typically more than 5%. When improvement is found, the previous material 9 disposed on outer surfaces 7A and 7B is removed, and the results of the visual field examination test are again incorporated into new depositing of material 9 on lens 5A and 5B. These method steps of testing and customizing lens 5A and 5B are repeated until sufficient visual progress is shown, or the visual defect is no longer present in the patient.

In operation, a typical result from a first visual field examination of a right eye of a patient is shown in FIG. 2. One skilled in the art would readily understand that the results show that a plurality of areas 17A includes visual defects, and the surrounding and encompassing area 19A does not include visual defects. Defective areas 17A are generally grouped on the left side of the visual midline. It is important to note that the optic nerve of this patient receives the entire visual field. However, due to hemianopia, the visual information captured in areas indicated by 17A does not travel to the brain due to damage along the normal information pathways.

As shown in FIGS. 2 and 3, area 19A of FIG. 2 is mapped to area 23A of FIG. 3. Once the size and shape of area 23A is determined from the results of the first visual field examination, material 9 is applied to make area 23A a corresponding translucent colored area having color 11. Similarly, area 17A of FIG. 2 is mapped to area 21A of FIG. 3, whereupon area 21A remains translucent and material 9 is not applied. One can readily see that FIG. 3 generally represents an inverse relationship with FIG. 2. This inverse relationship is a primary feature of the present invention, as the patient's areas of normal vision are forced to receive visual information through a colored filter, which is provided by material 9 and color 11.

Once material 9 is applied over area 23A, the patient wears lens 5A of FIG. 3 adjacent the patient's right eye for a particular time frame, typically two weeks. Upon expiration of the time frame, the patient returns and undergoes a second visual field examination. Typical results of a second visual field examination are shown in FIG. 4. It will be readily understood by those skilled in the art that areas 17A of FIG. 2 have diminished into areas 25A of FIG. 4, thus indicating that the patient now enjoys smaller areas of visual defect. Once again, areas 25A and 27A of the second visual field examination shown in FIG. 4 are mapped to areas 29A and 31A of lens 5A shown in FIG. 5. Likewise, material 9 is deposited on outer surface 7A within area 31A. The patient again wears reconfigured lens 5A adjacent to the patient's right eye for a particular time frame. Thereafter, the areas of visual defect will continue to shrink and in most cases is no longer present after several weeks of treatment in accordance with the present invention. This method of administering a visual field examination, mapping the results to lens 5A, and disposing lens 5A adjacent to the patient's eye for a period of time is repeated or iterated until the patient is satisfied with the progress or the patient's vision is completely restored.

Figure 7:
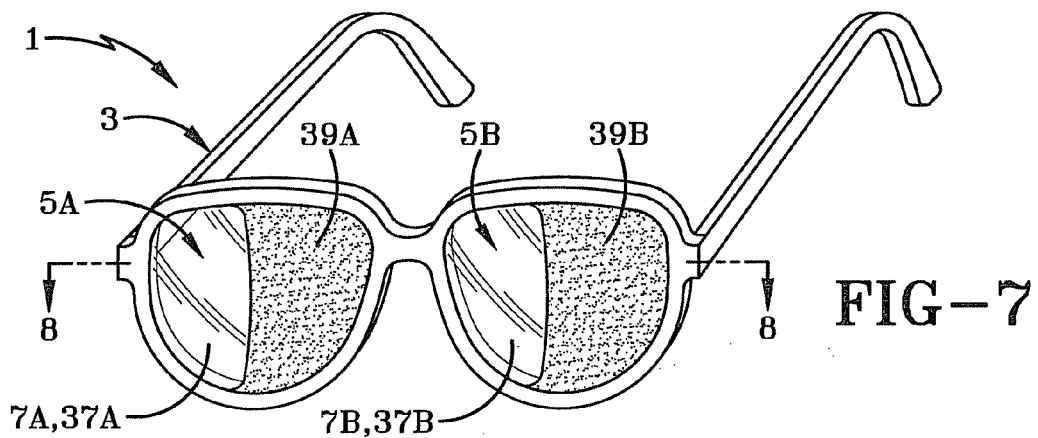
FIG. 7 is a corresponding lens system configured to accommodate and treat a patient with left-side neglect in both eyes.
Figure 8:
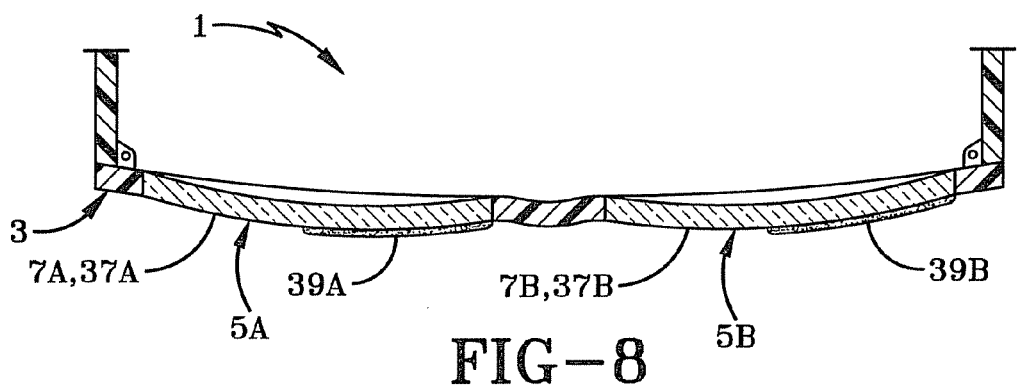
FIG. 8 is a top plan view of the lens system of FIG. 7.

FIG. 6 portrays the typical results from a visual field analysis wherein the patient suffers from left-sided neglect due to a stroke or other brain trauma. Likewise, FIGS. 7 and 8 portray a typical lens system 1 configured to treat a patient having the visual defects shown in FIG. 6. As shown in FIGS. 6-8, a pair of areas 33A and 33B correspond to a defect in the patient's visual field, whereas a pair of areas 35A and 35B correspond to an intact visual field. Under the present invention, these results are used to define corresponding areas on lenses 5A and 5B. As discussed previously, areas 33A and 33B from the visual field analysis map to areas 37A and 37B on lenses 5A and 5B, respectively. Likewise, areas 35A and 35B from the visual field analysis map to areas 39A and 39B on lenses 5A and 5B, respectively. Areas 39A and 39B are overlaid with translucent colored material 9 to slightly disrupt and colorize the light entering the intact visual field of the user. As shown in FIG. 8, material 9 is deposited on outer surfaces 7A and 7B, as this orients material 9 away from the patient's eyes, which prevents material 9 from inadvertently entering the eye and causing harm to the patient.

It has been found that the placement of material 9 on lens 5A and 5B disrupts in the intact visual field and stimulates the optic nerve to reroute incoming visual information along alternate pathways. As discussed previously, visual information from the defective areas of the visual field is continuously received by the optic nerve, yet for biochemical reasons, this received information cannot be properly routed to the brain for proper perception. However, when the new pathways from the optic nerve to the brain are used due to the colorized diffused light, the previously unperceived information from the defective area of the visual field is also passed along the alternative pathways and is thereafter perceived by the brain due to the use of an alternate visual path. Thus, the patient's sight is significantly and permanently improved, as the optic nerve and the brain "remember" how to re-route visual information around the damaged areas of the neural pathways.

As discussed previously, at each examination interval, the patient is examined and a new visual field examination is conducted. A new round of modifications to lenses 5A and 5B is conducted if the patient manifests an improvement of more than 5%. However, in practice, patients either respond well to treatment or they do not respond at all. Thus, if improvement is present, it is typically more than 30%. These unexpectedly fast results represent an enormous leap in the art, and further represent superiority over alternative methods of treatment, such as visual constraint therapy. Inasmuch as the patient's brain is not forced to make new synapses or cure the areas which have been damaged, and simply uses pre-existing alternative pathways to get the information to centers designated for vision in the brain, the treatment process is much faster as it is simply re-routing of the information from the eye to visual centers of the brain.

It should be emphasized that the fact that the use of translucent color is quite benign, and most patients after a few weeks adapt to the color so well that they lose their aversion to the existence of color in their field of vision making it possible to be very liberal in extending the duration of treatment. In contrast to visual constraint therapy where the obstruction remains a hindrance and the patient is cognizant of his inability to utilize the healthy areas. Under the present invention, patients do not experience the unsettling feeling of having the patient's normal eyesight blocked by opaque obstructions. Furthermore, a translucent colored eyeglass lens generally goes unnoticed by the general population, thus eliminating the embarrassment associated visual constraint therapy.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method of treating a patient comprising the steps of:
    examining the patient to determine an area of visual defect and an area of normal vision;
    mapping the area of visual defect onto a lens to form a defect area;
    mapping the area of normal vision onto the lens to form a normal area;
    applying a translucent material onto the lens in the normal area; and
    locating the lens adjacent to an eye of the patient for a set period of time.

2. The method of claim 1, wherein the translucent material includes a color tint.

3. The method of claim 2, wherein the color tint is blue.

4. The method of claim 2, further comprising the steps of:
    examining the patient to determine a preferred color tint out of a plurality of color tints; and
    applying the translucent material with the preferred color tint.

5. A method for rehabilitating a visual defect in a patient comprising the steps of:
    administering a vision test to locate an area of the visual defect within a field of vision perceived by the patient;
    correlating the area of the visual defect with a surface of a lens to define a defect area on the surface and a non-defect area on the surface, wherein the defect area is generally aligned with the area of visual defect as the patient looks through the lens to perceive the field of vision;
    applying a translucent material to the surface in the non-defect area; and
    locating the lens proximate the patient for a period of time, wherein the patient looks through the lens to perceive the field of vision.

6. The method of claim 5, wherein the translucent material includes a color tint.

7. The method of claim 6, wherein the color tint is blue.

8. The method of claim 6, further comprising the steps of:
    examining the patient to determine a preferred color tint out of a plurality of color tints; and
    applying the translucent material with the preferred color tint.

9. A method for rehabilitating vision of a person comprising the steps of:
    partitioning a lens into a first region and a second region, wherein the first region is substantially translucent and the second region is substantially transparent;
    placing the lens proximate an eye of the person;
    filtering visual sensory input through the lens and into the pupil of the eye; and
    administering a vision test to determine a defective region within the vision of the person, wherein the person has a diminished capacity to perceive objects within the defective region; and
    aligning the second region of the lens with the defective region when the lens is placed proximate the eye of the person.

10. The method of claim 9, wherein the translucent first region includes a color tint.

11. The method of claim 10, wherein the color tint is one of a red, a blue, and a green color.

12. The method of claim 10, further comprising the steps of:
    selecting a color tint;
    selecting a paint having the color tint; and
    applying the paint to the lens to provide the translucent first region.

13. The method of claim 12, further comprising the steps of:
    testing the person to determine a preferred hue; and
    selecting a paint having a color tint generally matching the preferred hue.

14. The method of claim 9, wherein the lens is supplied from a pair of eyeglasses provided by the person, wherein the eyeglasses are for normal daily use.

15. The method of claim 14, wherein the lens is free of an occluded region.

16. The method of claim 9, wherein the translucent first region includes a color tint.

17. The method of claim 16, further comprising the steps of:
- selecting a color tint;
- selecting a paint having the color tint; and
- applying the paint to the lens to provide the translucent first region.

18. The method of claim 17, further comprising the steps of:
- testing the person to determine a preferred hue; and
- selecting a paint having a color tint generally matching the preferred hue.

19. The method of claim 18, further comprising the step of air-brushing the paint onto the lens.

* * * * *